Sept. 12, 1950

D. H. ANDREWS 2,522,153

IMAGE SENSITIVE TUBE

Filed July 26, 1945

Inventor:

Donald H. Andrews

Pierce & Scheffler

Attorneys.

Patented Sept. 12, 1950 2,522,153

UNITED STATES PATENT OFFICE 2,522,153

IMAGE SENSITIVE TUBE

Donald H. Andrews, Baltimore, Md., assignor to Research Corporation, New York, N. Y., a corporation of New York Application July 26, 1945, Serial No. 607,249

6 Claims. (Cl. 250—164)

The invention relates to a novel image sensitive tube and is particularly directed to a tube for television and the like of increased sensitivity to radiant energy outside the visible spectrum region especially in the infra-red.

The image sensitive tube of the invention is characterized by the provision of a radiation sensitive screen comprising a mosaic of particles of a conductive substance, preferably a metal or metallic compound, maintained in the superconducting transition range of the substance.

The electrical resistance and magnetic permeability of a conductive substance decrease with decreasing temperature. At temperatures which differ for different substances, the electrical resistance and magnetic permeability suddenly fall substantially to zero. The transition from a condition of normal conductivity and permeability to superconductivity and extremely low permeability occurs, in general, over a temperature range amounting to a small fraction of one degree. This range, the position and extent of which depends on the particular conductor material, may be termed the superconducting transition range.

Inasmuch as the heat capacities of substances become very low at temperatures approaching absolute zero, a small amount of energy absorbed by a substance in the superconducting transition range can cause a relatively large increase in the electrical resistance and magnetic permeability of the substance. By projecting a radiant energy pattern or image, which may consist of visible light, ultraviolet radiation or infra-red radiation, upon a mosaic of particles of a substance maintained in its superconducting transition range, and scanning the mosaic with an electron beam, variations in potential corresponding to the variation in energy striking the individual particles result which may be used to modulate a signal in the manner well known in the television art.

While a number of metals and metallic compounds are suitable for the mosaic particles, such as tin, with a superconductive transition temperature of about 3.7° K., and lead, aluminum, columbium (niobium) and columbium (niobium) carbide with superconductive transition temperatures of about 7° K., 1° K., 9° K, and 10° K., columbium (niobium) nitride is particularly useful because of its relatively high superconductive transition temperature between 15° and 15.5° K.

A purpose of the invention is to provide an improved television tube.

A further purpose of the invention is to provide apparatus for converting invisible or poorly visible radiant energy images into readily visible images.

The invention will be more particularly described for the purpose of illustration with reference to the accompanying drawing in which.

Figures 1, 2, 3, 4:
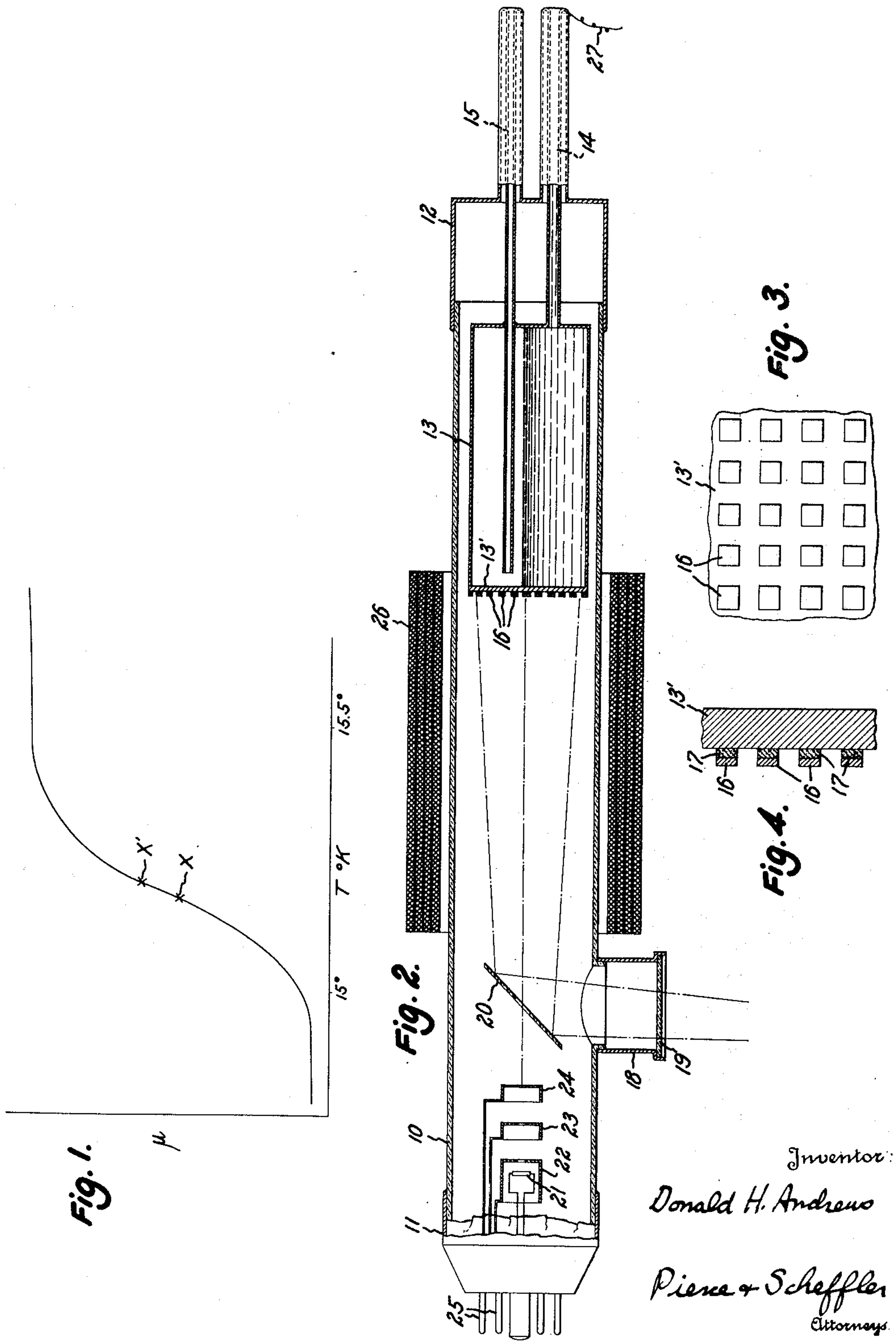
Fig. 1 is a graph illustrating the relation of the magnetic permeability of columbium nitride to its temperature in the neighborhood of its superconducting transition range.
Fig. 2 is a diagrammatic view in partial section of an image sensitive tube embodying the principles of the invention.
Fig. 3 is a fragmentary enlarged elevation of the mosaic screen of the invention.
Fig. 4 is a fragmentary enlarged cross-section of the mosaic screen of the invention.

Fig. 1 shows the relation of the magnetic permeability $\mu$ of columbium nitride to its temperature between about 15° and 15.5° K. It will be seen that as the temperature is reduced below 15.5° K. the magnetic permeability drops very rapidly over a range of a small part of a degree. Within that range a small amount of energy falling on a particle of columbium nitride at the temperature and permeability indicated by X will increase its temperature and likewise its permeability to the values indicated, for example, by X'.

The device shown in Figs. 2–4 is an illustrative example of the utilization of this phenomenon in the provision of image sensitive tubes for television and the like purposes.

In the tube of Fig. 2, an evacuable space is provided by cylinder 10, preferably of glass or other ceramic material, closed at one end by cap 11 and at the other end by cap 12.

Cap 12 supports a cylindrical refrigerant container 13 by means of refrigerant inlet tube 14 and refrigerant outlet tube 15 which are preferably vacuum jacketed in their projecting portions to reduce the transfer of external heat to chamber 13. The inner end wall 13' of the refrigerant chamber 13 is provided on its outer face with a mosaic, either regular or irregular, of particles 16 of a conductor, preferably columbium nitride for the reason stated above, attached thereto by a relatively poorly conductive material 17, for example, carbon.

The side arm 18 carries a window 19 which may be a lens. Mirror 20 which is provided with a central aperture directs the image rays entering the tube through window 19 upon mosaic 16.

Cap 11 supports a conventional electron gun comprising cathode 21, and accelerating and focussing electrodes 22, 23, 24, together with the associated circuit connecting plug 25. The paired magnetic deflection coils 26 serve to cause the electron beam to scan the mosaic plate by energizing the coils with synchronized deflection pulses in the well known manner.

As the electron beam passes successively over the particles of the mosaic screen 16, a varying potential is produced on plate 13' corresponding to the temperature image resulting from the effect upon the particles of the radiant energy image directed thereon by the optical system of the tube. This varying potential is applied through conductor 27 to a suitable circuit to obtain a modulated video signal in the manner well known in television practice, which may be converted into a visual image at the immediate point or after transmission to a receiving station or both.

The mosaic 16 may be maintained at the proper temperature by supplying continuously or intermittently to chamber 13 a refrigerant such as liquid hydrogen through tube 14 and allowing it to evaporate through tube 15 at a pressure corresponding to the desired temperature, or a gas at the desired temperature may be circulated through the chamber.

It will be seen that the invention provides a tube of increased sensitivity to radiant energy images particularly in the invisible infra-red region of the spectrum.

I claim:

1. In an image sensitive tube, an image screen comprising a mosaic of discrete metallic conductive particles, and cooling means adjacent said mosaic for maintaining the particles at a temperature within their superconductivity transition range.

2. In an image sensitive tube, an image screen comprising a mosaic of discrete particles of columbium nitride, and cooling means adjacent said mosaic for maintaining the particles at a temperature within their superconductivity transition range.

3. An image sensitive tube comprising an evacuated envelope, a mosaic screen in said envelope comprising a backing plate supporting discrete particles of a metallic conductive material, cooling means for maintaining the screen at a temperature within the superconductivity transition range of the particles, and means for causing an electron beam to scan said screen.

4. An image sensitive tube comprising an evacuated envelope, a mosaic screen in said envelope comprising a backing plate, discrete particles of metallic conductive material attached to said plate by a poorly conducting substance, cooling means for maintaining the screen at a temperature within the superconductivity transition range of the particles, and means for causing an electron beam to scan said screen.

5. An image sensitive tube comprising an evacuated envelope, a mosaic screen in said envelope comprising a backing plate, discrete particles of columbium nitride attached to said plate by a poorly conducting substance, cooling means for maintaining the screen at a temperature within the superconductivity transition range of the particles, and means for causing an electron beam to scan said screen.

6. An image sensitive tube comprising an evacuated envelope, a mosaic screen in said envelope comprising a backing plate, discrete particles of columbium nitride attached to said plate by carbon, cooling means for maintaining the screen at a temperature within the superconductivity transition range of the particles, and means for causing an electron beam to scan said screen.

DONALD H. ANDREWS.

REFERENCES CITED

The following references are of record in the file of this patent:

UNITED STATES PATENTS

| Number | Name | Date |
|---|---|---|
| 1,955,899 | Zworykin | Apr. 24, 1934 |
| 2,124,224 | Batchelor | July 19, 1938 |
| 2,128,631 | Eaton | Aug. 30, 1938 |
| 2,189,122 | Andrews | Feb. 6, 1940 |
| 2,241,974 | Anderson et al. | May 13, 1941 |